United States Patent [19]
Norton et al.

[11] 3,746,094
[45] July 17, 1973

[54] POLYALKENEOXIDE AND POLYSACCHARIDE GUM DERIVATIVES MOBILITY CONTROL AGENT AND PROCESS

[75] Inventors: Charles J. Norton; David O. Falk, both of Denver, Colo.

[73] Assignee: Marathon Oil Company, Findlay, Ohio

[22] Filed: Apr. 12, 1971

[21] Appl. No.: 133,060

[52] U.S. Cl. ................................................. 166/275
[51] Int. Cl. ............................................. E21b 43/16
[58] Field of Search.................... 166/273, 274, 275

[56] References Cited
UNITED STATES PATENTS
3,618,664  11/1971  Harvey................................ 166/274
3,208,518  9/1965  Patton................................. 166/275

*Primary Examiner*—Marvin A. Champion
*Assistant Examiner*—Jack E. Ebel
*Attorney*—Joseph C. Herring, Richard C. Willson, Jr. and Jack L. Hummel

[57] ABSTRACT

Flow resistance of aqueous polyalkeneoxide solutions, e.g., Polyox WRS–301, can be increased by adding high molecular weight polysaccharide gum derivative, e.g., Xanthan gums such as Kelzan (XC).* (*Kelzan (XC) is supplied by the Kelco Company, 3501 West Alabama Street, Houston, Texas, 77027.)

5 Claims, 1 Drawing Figure

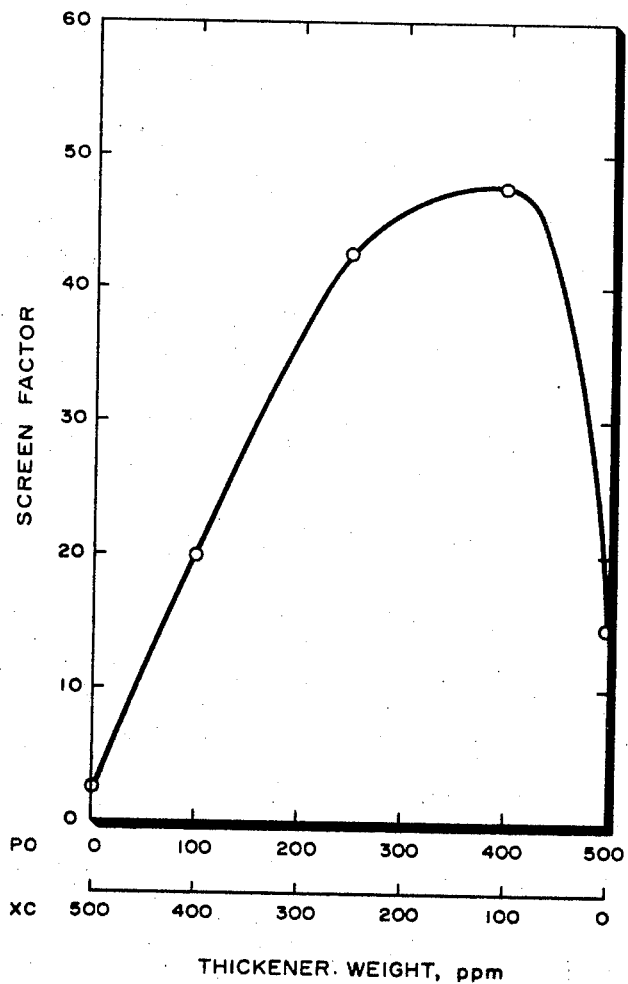
BLENDS OF POLYETHYLENE OXIDE (PO) AND KELZAN (XC) IN WATER EXHIBIT SYNERGISM ON SCREEN FACTOR.

3,746,094

POLYALKENEOXIDE AND POLYSACCHARIDE GUM DERIVATIVES MOBILITY CONTROL AGENT AND PROCESS

CROSS REFERENCES TO RELATED APPLICATIONS

The following cases relate to the same general field as that of the present invention: U. S. Pat. No. 3,507,331; U. S. Pat. No. 3,467,187; Ser. No. 74,336 filed Sept. 22, 1970; Ser. No. 76,140 filed Sept. 28, 1970; Ser. No. 67,726 filed Aug. 28, 1970; Ser. No. 79,591 filed Oct. 9, 1970; Ser. No. 85,064 filed Oct. 29, 1970; Ser. No. 126,731 filed Mar. 22, 1971; Ser. No. 133,060 filed Apr. 12, 1971; and Ser. No. 140,931 filed May 6, 1971.

BACKGROUND OF THE INVENTION

1. Field of the Invention

The present invention relates primarily to wells classified in Class 166 of the United States Patent Office and more particularly to production of earth fluid by driving fluid classified in Class 166 subclass 252.

2. Description of the Prior Art

Polyalkeneoxides such as polyethylene oxides, are described in the Union Carbide Corporation bulletins on their product Polyox, e.g., their Bulletin F–40246E, 10M–1968. The use of polyalkeneoxides, e.g., polyethyleneoxide, especially for the preparation of displacement fluids for use in secondary and tertiary recovery of petroleum from subterranean formations has been taught in a variety of prior art patents. U. S. Pat. No. 3,399,725 teaches use of polyethylene oxide improving water flooding processes. U. S. Pat. No. 2,842,492 teaches the use of copolymers such as methacrylic acid with methyl methacrylate, ethyleneglycol methacrylate styrene and acrylonitrile, in waterflooding processes. U. S. Pat. No. 2,771,138 teaches the recovery of oil from subterranean oil reservoirs using dissolved sugar and a water soluble salt of a metal selected from the class consisting of aluminum, lithium, and berylium. U. S. Pat. No. 3,039,529 teaches selective partially hydrolyzed polyacrylamides but presents no specific information relating to homopolymers, heteropolymers, or bulk heteropolymers of polyalkene oxides. U. S. Pat. No. 3,208,518 teaches that polymer solutions are less viscous and more injective at pH below 5; U. S. Pat. No. 2,827,964 teaches partially hydrolyzed polyacrylamides but mentions no mixture of homopolymers, heteropolymers, or bulk heteropolymers of polyalkene oxides; U. S. Pat. No. 3,002,960 prepares polyacrylamides for well injection to be resistant to connate brine and to absorption on formation rock but makes no mention of polyalkeneoxide; U. S. Pat. No. 3,074,481 is primarily concerned with well patterns and mentions no polyalkeneoxide; U. S. Pat. No. 3,139,929 is also primarily concerned with flooding geometry and use of water-soluble polymers thereof; U. S. Pat. No. 3,210,310 teaches in situ polymerization to give partial plugging around a well bore but mentions no polyalkeneoxide; U. S. Pat. No. 3,476,186 teaches flooding with acrylic acid-acrylamide-diacetone acrylamide copolymer but mentions no polyalkeneoxide. Moreover, factors influencing mobility control by polymer solutions are discussed in Paper No. SPE 2867 of the Society of Petroleum Engineers of the American Institute of Mining Engineers, which paper also describes the screen viscometer and screen factor discussed later in this application. However, none of the prior art, to the best of our knowledge, teaches the improved resistance factors (screen factors) and mobility control of aqueous polysaccharide gum solutions obtained by mixing synergistic amounts of polymers containing heteropolymers or block polymers of polyethylene oxide and polypropylene oxide, as included within the present invention.

SUMMARY

General Statement of the Invention

Polyalkeneoxide polymers and mixed polyalkeneoxides alone, i.e., poly(propyleneoxide)-poly(ethyleneoxide), have been used as "thickening agents" to increase the viscosity of liquids. Polyethyleneoxide has been used as a displacing liquid in secondary petroleum recovery. Such uses are taught, for example, in Union Carbide's bulletin, supra, and in U. S. Pat. No. 3,116,791. These polyalkeneoxides decrease the mobility of the displacing liquids to improve their efficiency in displacing oil-in-place from formations and moving the oil toward production wells. Decreasing the mobility of the displacing fluid minimizes "fingering" or channeling of a displacing fluid through the body of oil-in-place in the formation.

A laboratory method for obtaining a measure of the relative mobility of fluids is described in the American Institute of Mining Engineers' paper "Factors Influencing Mobility Control by Polymer Solution" by R. R. Jennings, J. H. Rogers, and T. J. West, Society of Petroleum Engineers Paper No. 2867 prepared for the Ninth Biennial Production Techniques Symposium, held in Wichita Falls, Texas, May 14–15, 1970.

In the testing, the liquids flow through screens and the ratio of the time required for the test solution to flow through the "screen viscometer" divided by the time required for a standard solvent (water) to flow through the viscometer is termed the "screen factor."

According to the present invention, the "screen factor" and mobility control of aqueous solutions of polyalkeneoxide, e.g., polyethylene oxide, can be inexpensively and effectively increased by the addition of polysaccharide gum derivatives, e.g., Kelzan (XC), having a molecular weight in the range of from about $10^4$ to about $10^8$, more preferably from $10^5$ to about $10^7$, and most preferably from $1 \times 10^6$ to about $6 \times 10^6$. The present invention is useful with any of the general class of polyalkeneoxides. The preferred polyalkeneoxides have molecular weights of from $10^5 - 10^8$ and more preferably from $10^6 - 10^7$ and most preferably from $3 \times 10^6 - 6 \times 10^6$.

As mentioned above, the process and compositions of the present invention are useful for the decreasing of mobility of liquid solutions especially for use in the secondary and tertiary recovery of petroleum by displacement of oil-in-place from subterranean oil-bearing formations. In general, the techniques of secondary and tertiary recovery are applicable to the use of the invention and standard works such as *Secondary Recovery* by C. R. Smith, (Reinhold, 1966) should be consulted in this connection.

BRIEF DESCRIPTION OF THE DRAWINGS

The drawing is a plot of "screen factor" versus polyethylene oxide (PO) and polysaccharide gum derivatives, e.g., Xanthan gum such as Kelzan (XC), at various portions in parts per million showing the unexpected increase in "screen factor" value well above the predicted linear expectations.

DESCRIPTION OF THE PREFERRED EMBODIMENTS

Starting Materials

As mentioned above, the polyalkeneoxides will preferably have moledular weights in the range of from about $10^5$ to about $10^8$, more preferably from $10^6$ to $10^7$ and most preferably from $3 \times 10^6$ to $6 \times 10^6$. Preferably the polyalkeneoxides will be present in amounts of from 0.001 to about 10.0, more preferably from 0.01 to about 1.0, and most preferably from 0.02 to about 0.2 weight percent based on the weight of the total solution. The polysaccharide gum derivative will preferably have molecular weights in the range of from $10^4$ to $10^8$, and more preferably from $10^5$ to $10^7$, and most preferably from $1 \times 10^6$ to about $6 \times 10^6$. Preferably, the polysaccharide gum derivative will be present in amounts of from 0.001 to about 10, more preferably from 0.01 to about 1.0, and most preferably from 0.02 to about 0.2 weight percent based on the total solution.

The amount of polyalkeneoxide will generally be in the range of 10 to 100,000, more preferay from 100 to about 10,000 and most preferably from about 200 to 2000 parts by weight per million parts of solution. The amount of polysaccharide gum derivative will generally be in the range of from about 10 to 100,000, more preferably from 100 to 10,000 and most preferably from about 200 to 2000 parts by weight per million parts of solution.

By "polyalkenoxide" is meant herein any of the polymeric water-soluble resins prepared by homopolymerization of a single alkene oxide, for example ethylene oxide, propylene oxide, butylene oxides, having polymer weights of $10^4$ to $10^8$. While any of the polymerized alkene oxides (preferably lower alkene oxides) may be employed in the practice of the invention, it is preferred to employ the homopolymer of polyethylene oxide. This product is made commercially by Union Carbide Chemicals Company under the trade name "Polyox." Mixed poly(alkeneoxides), (made by heteropolymerization of more than one alkene oxide in either a random or block polymerization), may also be employed.

Particularly preferred are polyalkyleneoxides comprising groups containing the following monomer unit structure:

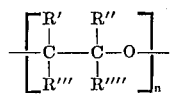

wherein R', R'', and R''', may be the same or different and are selected from the group consisting of hydrogen and alkyl radicals containing from 1 to 6 carbon atoms.

Xanthan gum is an exemplary polysaccharide gum derivative. By xanthan gum derivatives is meant herein the polysaccharide derivative produced by the microorganism *Xanthomonas compestris*, especially when culture in a synthetic nutrient media containing carbohydrates, especially sucrose and/or glucose. Production of this xanthan gum derivative is well described in (1) Smiley, K. L. "Microbiol Polysaccharides - A Review." *Food Technology* 20, 9:112–16 (1966). and (2) Moraine, R. A., Rogovin, S. P., and Smiley, K. L. "Kinetics of Polysaccharide B-1459 Synthesis." *J. Fermentation Technol.* 44,311–2 (1966).

The solvent for the lqiuid solutions of the present invention will comprise water, most preferably consist essentially of connate water, example, Palestine line water, fresh water, or brackish water. It is preferable that the water contain less than about 300,000, more preferably less than about 10,000, and most preferably less than about 500 parts million of dissolved solids.

While not necessary to the practice of the present invention, various other ingredients including among others, cellulose and surfactants, e.g., polyalkylaryl sulfonates and other conventional displacement fluid additives may be added to the liquid polymer solutions. In addition to polyalkeneoxides, other viscosity increasing agents, e.g., carboxymethylcellulose or other biopolymers, may be employed. Any of the aforementioned specific ingredients may be employed in admixture.

Preparation of Liquid Systems

It will generally be preferable to merely co-mix the non-aqueous polyalkeneoxide and xanthan gum derivative and then add water while gently stirring to promote dispersion, suspension, and solution. Bubbling a small amount of non-oxygen gas, e.g., natural gas, may be used to effect mild stirring. The ingredients will preferably be mixed at a room temperature somewhat above room temperature, more preferably from 0°C. to about 100°C., and most preferably from 20°C to about 50°C. If desired, a mixing operation can be employed in one or more full-type mixers or mixing tees so long as the proportions of the ingredients are properly measured and thoroughly mixed.

EXAMPLE I

Aqueous solutions of polysaccharide gum derivative, i.e., the xanthan gum sold under the trade name "Kelzan," and poly(ethyleneoxide), e.g., Polyox, are prepared by weighing both solids into a bottle, adding deionized water, stirring slowly with a magnetic bar for several hours unitl visually dissolved, and then allowing to stand for one day. Testing for "screen factor" is done according to Society of Petroleum Engineers Paper No. 2867, discussed supra, and the proportions and test results are summarized in Table 1 and FIG. 1.

TABLE 1

| Poly(ethylcneoxide) | Polysaccharide (Kelzan) | Screen Factor |
|---|---|---|
| 100 ppm | 400 ppm | 19.95 |
| 250 ppm | 250 ppm | 42.36 |
| 400 ppm | 100 ppm | 47.24 |

EXAMPLES II – IV

Three, 3-inch diameter by 4-foot long Berea sandstone cores are prepared by procedure summarized in Table 2. The preparative core data indicate that the pore volumes and porosities are comparable. The comparative "secondary" waterflood also give very closely comparable initial oil ($O_i$), water ($W_i$) saturations, residual oil ($O_r$), and water ($W_r$) saturations for these three secondary waterflood floods.

Three thickened waters are prepared by dissolving 1) 500 ppm "Polyox", 2) 250 ppm Polyox and 250 xanthan gum derivative (Kelzan XC), 3) 500 ppm Kelxan (XC) each respectively in synthetic Palestine water. After solution, up to 1.00 pore volume of each of these thickened waters is used to carry out the tertiary flood. Each of the cores is equipped with pressure transducers

TABLE 2

[Preparation of cores for thickened water floods]

| Example | Core data | | | Secondary water flood [1] | | | | Tertiary flood with water thickener [p.p.m.] |
|---------|-----------|---|---|---|---|---|---|---|
| | PV, cc. | Porosity | Permeability, md. | $O_i$ | $W_i$ | $O_r$ | $W_r$ | |
| II | 1,030 | 0.220 | 415.0 | 0.65 | 0.35 | 0.37 | 0.63 | 500 XC |
| III | 1,065 | 0.220 | 366 | 0.61 | 0.38 | 0.38 | 0.62 | 250 XC 250 PO |
| IV | 1,080 | 0.210 | 325.0 | 0.57 | 0.40 | 0.36 | 0.64 | 500 PO |

[1] 4 ft. × 3 in. Berea fired at 825° F., saturated with Henry brine (i.e., connate brine having 11,000 p.p.m. Cl⁻, 6,500 p.p.m. Na⁺, 276 p.p.m. Ca⁺⁺, 167 p.p.m. Mg⁺⁺) and crude oil (7 cp. at ambient temperature) to oil initial ($O_i$) and water ($W_i$); subsequently water flooded to residual saturations ($O_r$ and $W_r$) and then flood at rates of 3.7 (day) and 1.9 (night) ft./day with synthetic "Palestine Water" containing 400 p.p.m. NaCl and 55 p.p.m. CaCl₂ and 500 p.p.m. thickener.

at the front end, middle and end of the core and a history of readings is taken as the injection proceeds. The reciprocal mobility values are calculated by means of the Darcy equation, $$\text{reciprocal mobility} = [kxA\ (\Delta P)]/q\ l$$

where $k$ is the permeability, $A$ is the cross-sectional area in cm², $\Delta P$ is the pressure change in atmospheres, $q$ is the throughput flow rate in cm²/sec, and $l$ is the length of the core. The reciprocal mobility measured at the front (injection port) should show pronounced synergistic effect of polysaccharide gum derivatives on Polyox (PO) over the region of 0.0 - 1.0 PV. Synergism should become apparent at the middle and terminal port after 0.1 pore volume is injected. The effectiveness of this reciprocal mobility maintenance is also reflected in synergistic improvement in oil production for 0.05 to 2.0 pore volumes of 250 ppm polysaccharide gum derivatives — 250 ppm Polyox thickened water injection.

The reciprocal mobility value will increase unusually in the range of from 5 to about 100 reciprocal millidarcies in the range of from 0.1 to 1.0 pore volumes throughput. Use of the specific ranges of concentration taught in the present specification in combination with the particularly preferred ranges of pore values results in a secondary or tertiary recovery operation of especially unexpectedly high efficiency.

Modifications

It will be understood by those skilled in the art that the xanthan gum derivative utilized in the examples herein are merely preferred examples of the variety of polysaccharide derivative permeability modifying agents which may be employed with the present invention. Other such polysaccharide derivatives permeability modifying agents include derivatives of starch, dextrin, dextran, and other vegetable and microbial gums.

A useful modification of the invention is to vary the relative proportions of the polysaccharide gum derivatives in the viscosity increasing solution, for example, using a solution containing nearly 100 percent polysaccharide gum derivatives solute at the leading edge of the displacement slug and gradually using a higher and higher equivalent percentage of polyethyleneoxide to provide a slug which is rich in the depletable component, polysaccharide gum derivatives at its leading edge where depletion is most likely to occur. Initial viscosity of the slug may be the same at all points throughout the slug or may be itself gradually decreased until it approaches that of the drive fluid which displaces the slug through the formation.

Of course, slugs of other displacement fluids, e.g., soluble oils and other micellar solutions, emulsions, etc. be injected prior to the solution of the invention where desirable. Similarly, drive fluids, e.g., water, mobility buffers followed by water, etc. can be injected after the fluids of the present invention. Also the fluids of the invention can be used to displace slugs of other fluids through the formation and can themselves be driven by other fluids.

What is claimed is:

1. A process for the displacement of oil in oil-bearing formation comprising injecting into said formation an aqueous solution comprised of about 0.001 to about 10.0 percent by weight of water soluble polyethyleneoxide having molecular weight in the range of from about $10^5$ to about $10^8$ and 0.001 to about 10 weight percent water soluble polysaccharide gum derivatives produced by fermentation of carbohydrates by xanthomonas bacteria, said percents being based on the weight of the total solution.

2. A process according to claim 1 wherein the solution of polyethylene oxide is about 100 to about 10,000 parts per million and polysaccharide gum derivatives is about 200 to about 2000 parts per million.

3. Process according to claim 1 wherein the polysaccharide gum derivative has a molecular weight above 100,000 prior to co-mixing with the polyethyleneoxide polymer.

4. Process according to claim 1 wherein the polysaccharide gum derivative has a molecular weight of from 1,000,000 to about 10,000,000 prior to addition to the polyethyleneoxide polymer.

5. Process according to claim 1 wherein the polysaccharide gum derivative is present in a concentration of from about 0.01 to about 1.0 percent by weight based on the weight of the total solution.

* * * * *

UNITED STATES PATENT OFFICE
CERTIFICATE OF CORRECTION

Patent No. 3,746,094  Dated  July 17, 1973

Inventor(s) Charles J. Norton et al

It is certified that error appears in the above-identified patent and that said Letters Patent are hereby corrected as shown below:

| | |
|---|---|
| Col. 3, line 8: | Delete "moledular" and insert --molecular--. |
| Col. 3, line 24: | Delete "preferay" and insert --preferably--. |
| Col. 4, line 3: | Delete "lqiuid" and insert --liquid--. |
| Col. 4, line 41: | Delete "unitl" and insert --until--. |
| Col. 5, line 20: (in the formula) | Delete "/gl" and insert --/ql--. |

Signed and sealed this 17th day of September 1974.

(SEAL)
Attest:

McCOY M. GIBSON JR.
Attesting Officer

C. MARSHALL DANN
Commissioner of Patents